Oct. 15, 1935.　　　　J. WOLFINGER　　　　2,017,559

BEET SLICER

Filed Nov. 6, 1931　　　3 Sheets-Sheet 1

Inventor
J. Wolfinger
By [signature]
Attorneys

Oct. 15, 1935.  J. WOLFINGER  2,017,559
BEET SLICER
Filed Nov. 6, 1931   3 Sheets-Sheet 2

Inventor
J. Wolfinger

Oct. 15, 1935.   J. WOLFINGER   2,017,559
BEET SLICER
Filed Nov. 6, 1931   3 Sheets-Sheet 3
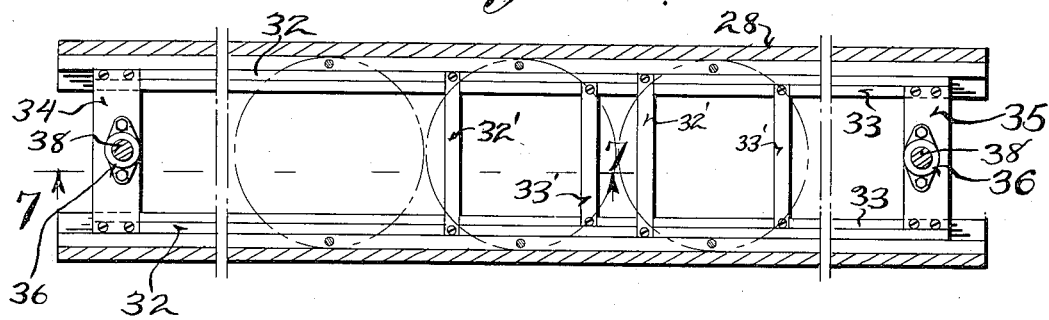
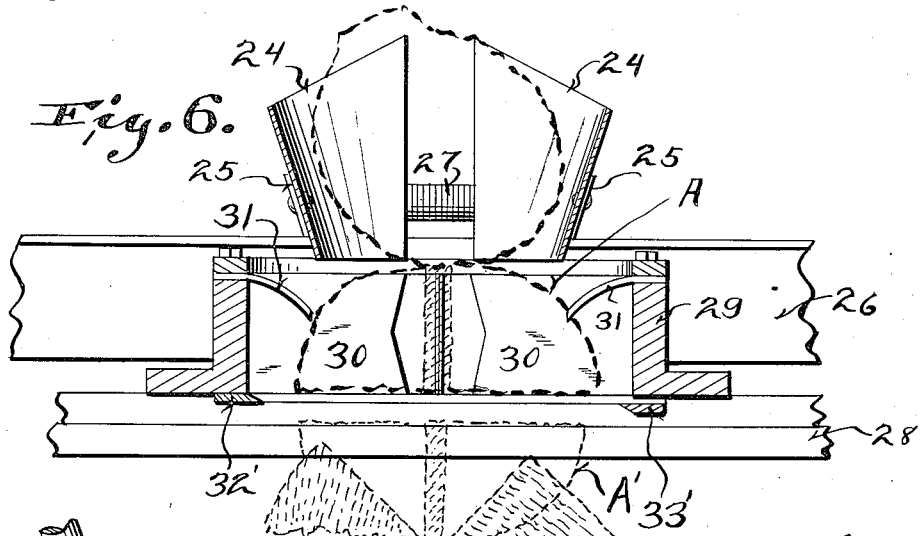
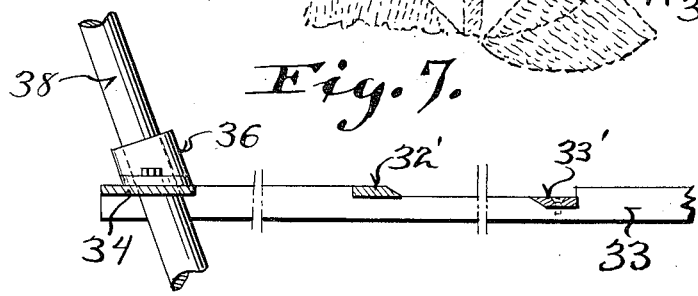
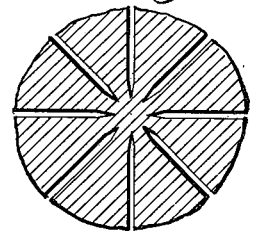
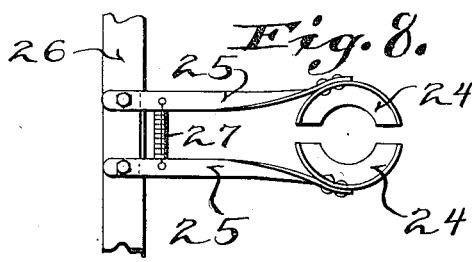

Patented Oct. 15, 1935

2,017,559

UNITED STATES PATENT OFFICE 2,017,559

BEET SLICER

Joseph Wolfinger, Dundas, Wis.

Application November 6, 1931, Serial No. 573,354

4 Claims. (Cl. 146—169)

My invention relates to beet cutting machines, and it has its primary object to provide:—

Means for cutting beets, vegetables, or fruits into a plurality of sections.

Specific objects of my invention are:—

To provide means for cutting beets into a plurality of horizontal and vertical sections; to provide means for separating large and small beets, delivering the same to nests of cutting knives, and splitting the small beets into a plurality of vertical sections, and the large beets into a plurality of vertical and horizontal sections.

To provide a nested cutting mechanism including yieldable cups, horizontally disposed radial knives thereunder, operating in conjunction with vertically disposed knives positioned under the radial knives, whereby large beets are cut both vertically and horizontally into a plurality of sections.

With the above and other minor objects in view, the invention consists in certain peculiarities of construction and combination of parts, as will be fully set forth with reference to the accompanying drawings and subsequently claimed:

In the drawings, Figure 1 represents a front elevation of a cutting machine embodying the parts of my invention;

Figure 2 is a detailed fragmentary plan view upon a larger scale, illustrating feeding means and cutting means for beets, or the like.

Figure 5 is a detailed plan sectional view, indicated on the line 5—5 of Figure 1, the said view showing specifically a group of horizontal cutting knives;

Figure 6 is an enlarged sectional view of the nested cutting mechanism, indicated on the line 6—6 of Figure 2, the section illustrating the yieldable cup, the vertical and horizontal cutting knives;

Figure 7 is a detailed fragmentary sectional view of the horizontal cutting knives and carriers therefor, the section being indicated by the line 7—7 of Figure 5;

Figure 8 is a detailed plan view illustrating the yieldable cup for receiving the beets preparatory to being discharged into the nest of radially disposed knives; and, Figure 9 is a sectional plan view illustrating a beet after it has passed through the nest of vertical radially disposed knives, whereby said beet is cut into a plurality of sections, leaving a slotted core therethrough.

Figure 3:
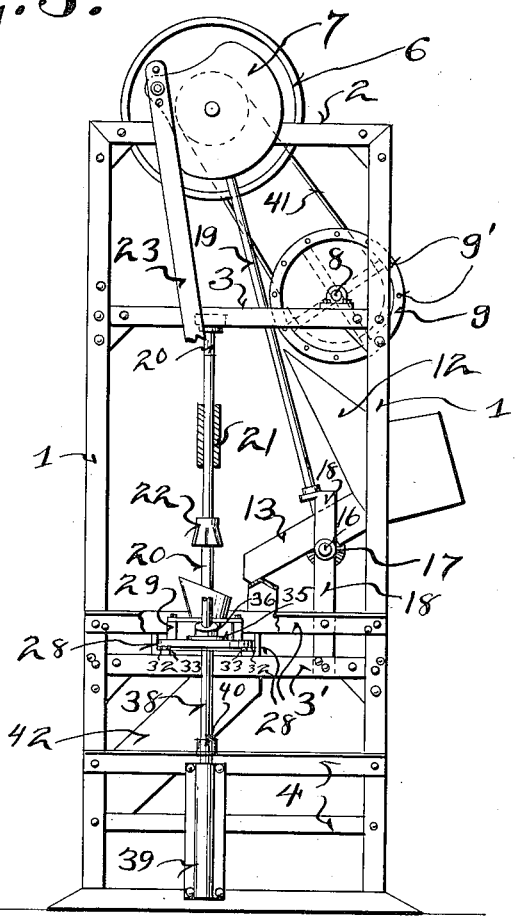
Figure 3 is a side elevation of the machine, with parts broken away and in section to more clearly illustrate structural features.

Referring to the drawings, the numeral 1 represents the vertical front and rear frame struts having a top horizontal connecting strut 2, intermediate companion struts 3 and sets of parallel struts 3', which serves to support in general the nested cutting means, and a second set of parallel struts 4 near the base of the frame, as best shown in Figure 3 of the drawings.

Mounted on the frame struts 2 is a drive shaft 5, carrying suitable drive pulleys 6 and counterbalanced crank wheels 7—7, secured to the ends thereof. The horizontal struts 3 carry journal bearings for a shaft 8—8. This shaft carries a cage drum 9, which is conical in shape and provided with a spoked wheel portion 10 at its smaller end, through which beets are discharged into said cage drum, by means of a chute 11. Thus, it will be seen that the bars 9' of the cage drum at the smaller end are closer together and wider at the blind end.

It will be seen that when beets are discharged into the grader, the smaller beets will first drop between the bars as they travel from end-to-end, and the larger beets will be discharged from said grader at the rear end into a suitable partition hopper 12.

From this hopper 12, the larger beets, for example, are discharged through nozzles 13 into a group of cutting nests to be hereinafter described. The smaller beets are discharged into a like group of cutting nests, through nozzles 14, which nozzles all extend from the hopper 12.

Figures 1, 2:
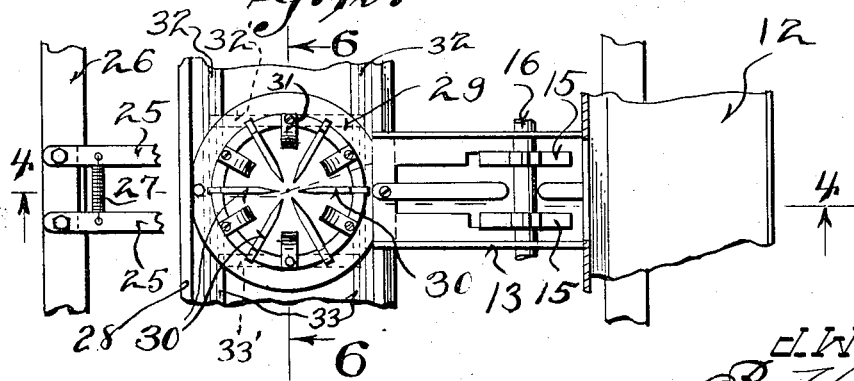
Figure 4:
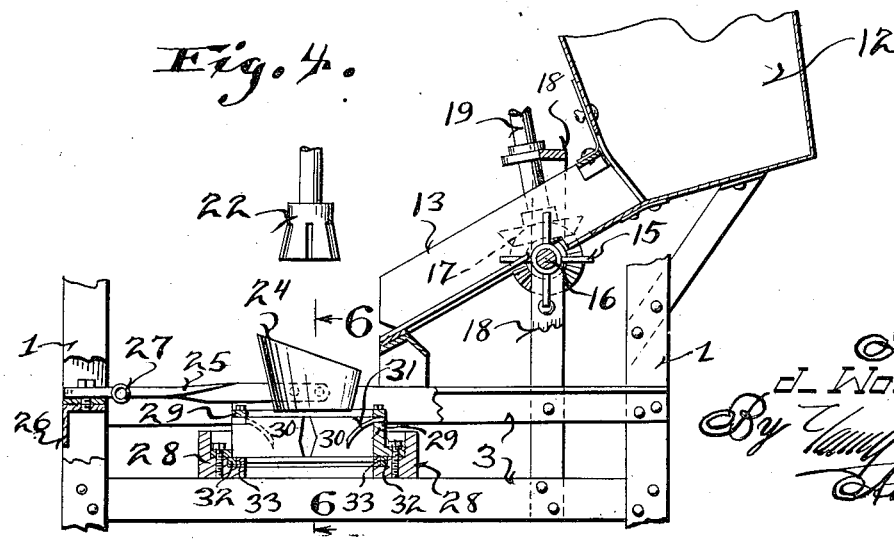
Figure 4 is an enlarged sectional side elevation of the beet feeding means and the nest, the section being generally indicated by a line 4—4 of Figure 2.

As best shown in Figure 4 of the drawings, the bottom of the nozzle 13 is slotted for the reception of arms of a star wheel 15, which star wheel is mounted on the shaft 16 that is supported and journalled upon the arms 18, which are secured to the cross frame struts or braces 3'. As best shown in Figures 1 and 4, this star wheel shaft 16 is driven by a bevel gear connection 17 from the drive shaft 5 through a corresponding bevel gear connection 18' and a vertically disposed counter shaft 19, which counter shaft is supported in suitable bearings above and below and are associated with the frame.

The frame struts 3 and 3' have secured thereto, rods 20, which rods have reciprocatively mounted thereon, a cross head 21 that carries the stems of a series of adjustable plunger heads 22. The plunger heads are radially slotted, whereby a yield is effected and said slots also permit the plunger heads to enter and mesh with a plurality of vertically disposed radial knives thereunder, to be hereinafter described.

The cross head 21 is provided with arms 21' at its end to which are pivotally connected crank bars 23, the upper ends of the crank bars 23 being also pivotally connected to the crank wheels 7, whereby reciprocative motion is imparted to the plurality of plunger heads.

Each plunger head has aligned thereunder, a receiving nest for the beets, and these nests are provided with separable cup sections 24—24, the same being yieldably mounted upon arms 25—25, which arms are pivoted to a front frame member 26 and are also connected by a coil spring 27, whereby yielding action is had, the same being clearly shown in Figure 8 of the drawings.

As best shown in Figures 3, 5, and 6 of the drawings, the frame has mounted thereon, transverse disposed parallel angle bars 28, which angle bars have fitted thereto, flanged rings 29 and are aligned with the cup sections 24 and mounted thereunder. The rings 29 each carry a set of radially and vertically disposed knives 30, as best shown in Figure 2, and between each set of knives, there is secured radially disposed and downwardly extended friction gripping tongues 31, whereby the beets when being cut into sections are frictionally held in position.

The angle bars 28 have slidably mounted therein, a pair of outwardly disposed strips 32 and a corresponding pair of inwardly positioned strips 33, as best shown in Figures 5, 7, and 4. The outer set 32 is connected by a cross bar 34 and the inner set 33 by a cross bar 35. Thus, it will be seen that these strips and cross bars each constitute a yoke and the inner set of cross bars is connected by knives 33', while the outer set is connected by corresponding knives 32'.

The cross bars 34 and 35 are apertured and having mounted thereon in alignment with said apertures are thimbles, which thimbles are provided for the reception of cam rods 38, as best shown in Figures 1 and 7, the upper ends of the cam rods 38 are connected to the cross head 21 and the lower ends of said cam rods are fitted in plunger barrels 39, secured to the side struts of the frame, there also being guide ears 40 for said arm which extends from the frame member.

The cage grading mechanism previously described is rotarily driven by means of a pulley and belt connection 41, between the grade shaft 8 and the drive shaft 5, as indicated in Figures 1 and 3 of the drawings.

In operation, the small beets are discharged through the front feed end of the grader and the larger beets out the rear end of said grader, passing into the hopper 12 and through the nozzle, and are delivered one by one to the series of receiving nests, the beet delivery being controlled by the star wheel 15.

Each beet drops into its associated yieldable cup 24 and thereafter the series of plunger heads will force the beets through the cups, causing them to be engaged by the radially cutting knives 30, whereby as shown at A, in Figure 6, the beet is practically severed throughout its vertical body by said knives. The plunger heads are then returned upwardly to their idle positions, and at this time, the horizontally disposed knives 32' and 33' through the action of the cam rods will move towards each other, and in so doing, horizontally sever the lower half of the beet from the upper half, as indicated at A'.

Thus, this lower half of the beet is delivered in minute sections to a partition discharge hopper 42, it being understood that the larger series of nests are provided with this horizontal cutting mechanism, whereby the smaller beets are simply vertically severed. After this, it is also understood that the upper half of the beet will be held in suspension as indicated in Figure 6 of the drawings at A through frictional engagement with the tongues 31 and also due to the friction of the rod knives, bearing in mind that the unsevered core will hold this upper section of this half of the beet in an integral mass.

In the next partition, a beet is dropped into each set of cups, and the plungers will repeat their downward movement whereby the top half of the beet is forced out of the nest through pressure of the incoming beet which is directly acted upon by the plunger.

I claim:

1. A vegetable cutter comprising a supporting frame, a transverse row of resilient vegetable receiving cups carried by the frame, a set of stationary vertically disposed knives arranged below each cup, a reciprocating transversely extending cross head mounted upon the frame above the cups, a plunger secured to the cross head for each cup, means for reciprocating the cross head, a pair of transversely movable knife frames reciprocally mounted on the frame, oppositely disposed sets of knives secured to the knife frames, guide thimbles carried by the opposite ends of the frames, and cam rods secured to the cross head for movement therewith slidably mounted within the thimbles.

2. A vegetable cutter comprising a supporting frame, a transverse row of resilient vegetable receiving cups mounted on the frame, a set of vertically disposed stationary knives mounted below each cup, a transversely extending cross head reciprocally mounted on the frame above the cups, a plunger for forcing the vegetables through the cups secured to the cross head for each cup, an operating shaft rotatably mounted on the frame above the cross head, means for actuating the shaft, crank wheels secured to the opposite ends of the shaft, pitman rods operatively connecting the crank wheels to the cross head, transversely movable knife frames arranged below the cups, oppositely disposed cutting knives secured to the knife frames, guide thimbles secured to the opposite ends of the knife frames, and depending cam rods connected with the cross head slidably received in the guide thimbles.

3. A device to cut vegetables comprising, two spaced upright side frames, a plurality of hoppers positioned between the side frames, a grading drum rotatably mounted between the side frames above one of the hoppers and adapted to drop vegetables smaller than a predetermined size into said hopper and to conduct vegetables larger than the predetermined size to the other hopper, a slicer for each hopper comprising a plurality of radial knives, a centering hopper for each slicer, rotatable paddle wheels to convey vegetables from the hoppers to the centering hoppers, a shaft journalled in the side frames mounting said paddle wheels, a plunger associated with each slicer to push vegetables past the knives, a cross bar slidably mounted at its opposite ends from the spaced side frames to carry the plungers, a driven shaft extending across the upper portion of the side frames, cranks on the ends of said driven shaft, pitmen connecting the cranks with the opposite ends of the transverse bar on which the plungers are mounted to reciprocate the bar and the plungers, and a driving connection from said driven shaft to the rotatable shaft carrying the paddle wheels.

4. A device to cut vegetables, comprising spaced upright supports, spaced parallel bars rigidly connecting the upright supports near their bottoms, a plurality of slicing elements mounted on said bars, each element comprising a series of radiating knives set in a tubular support with the knife edges uppermost, means to deposit vegetables onto said slicing elements, plungers to push the vegetables down through the slicing elements, a pair of transversely operating knives disposed beneath each of said knife elements to sever the vegetables transversely, and means to actuate said transversely operable knives comprising two sets of spaced rods slidably mounted from said parallel bars, one knife of each pair of transverse knives being attached to the bars of one set and the other knife of said pair being attached to the bars of the other set, one set of bars projecting beyond one of the upright supports and the other set of bars projecting beyond the other upright support, a movable member mounted on the upright supports and connected with the projecting ends of the bars to cause the bars to reciprocate, and synchronized means to actuate said movable member to cause the bars to move simultaneously toward and away from each other.

JOSEPH WOLFINGER.